United States Patent [19]

Freter

[11] 4,035,803
[45] July 12, 1977

[54] CIRCUIT ARRANGEMENT FOR DETERMINING THE DISTANCE TO A VOR TRANSMITTER STATION

[75] Inventor: Walter Freter, Munich, Germany

[73] Assignee: Siemens Aktiengesellschaft, Berlin & Munich, Germany

[21] Appl. No.: 574,702

[22] Filed: May 5, 1975

[30] Foreign Application Priority Data

Feb. 21, 1975 Germany .......................... 2507525

[51] Int. Cl.² ........................................ G01S 1/44
[52] U.S. Cl. .......................... 343/106 R; 343/107
[58] Field of Search ............ 343/106 R, 107, 112 D

[56] References Cited

U.S. PATENT DOCUMENTS

| | | | |
|---|---|---|---|
| 3,653,047 | 3/1972 | Anthony | 343/106 R |
| 3,792,473 | 2/1974 | Sawicki | 343/106 R |
| 3,800,125 | 3/1974 | Cleary, Jr. | 343/106 R |

*Primary Examiner*—Maynard R. Wilbur
*Assistant Examiner*—T. M. Blum
*Attorney, Agent, or Firm*—Hill, Gross, Simpson, Van Santen, Steadman, Chiara & Simpson

[57] ABSTRACT

A circuit arrangement for determining the distance of an aircraft from a VOR transmitter is connected with a VOR receiver which determines angular information of the VOR transmitter perpendicular to the radial position line with an accuracy of α degrees from one bearing shift to the next. The arrangement includes a pulse generator operable to produce counting pulses at a predetermined pulsing frequency of less than 1 Hz, preferably 0.95 Hz or 0.0549 Hz, and feeds the pulses to a counter. Apparatus responsive to a bearing shift applies the counting pulses to the counter and removes the counting pulses from the counter in response to the next bearing shift. A display is connected to the counter and calibrated in minutes for displaying the count to a pilot in order to indicate the flight time to the VOR transmitter at the airspeed employed in the measuring operation.

8 Claims, 6 Drawing Figures

CIRCUIT ARRANGEMENT FOR DETERMINING THE DISTANCE TO A VOR TRANSMITTER STATION

BACKGROUND OF THE INVENTION

1. Field of the Invention

The present invention relates to a circuit arrangement for determining the distance of an aircraft from a VOR transmitter station, using a VOR receiver which determines the angular information of the VOR transmitter station perpendicular to the radial position line with an accuracy of $\alpha$ degrees from one bearing shift to the next.

2. Description of the Prior Art

A known VOR navigational system (VOR = very high frequency omni range) operates with a navigational receiver which incorporates two receiver sections. The first receiver section contains the reference phase, transmitted as a frequency modulation, in a demodulated form which serves as a reference signal. In a second receiver section, the rotational phase, which depends upon the particular direction of the antenna radiation pattern, occurs in the form of an amplitude modulated rotational signal. From a comparison of the reference phase with the rotational phase, the information concerning the azimuthal angle can be obtained.

The determination of the angular information can be effected to an accuracy of $\alpha$ degrees. A particularly simple circuit for determining accurate angular information, e.g. in increments of $\alpha = 1°$, has been disclosed in U.S. patent application Ser. No. 574,633, filed May 5, 1975, corresponding to German Patent Application No. P 24 21 722.9 dated May 6, 1974 and entitled "Analyzer Device for a VOR Navigational Receiver."

SUMMARY OF THE INVENTION

The object of the present invention, considering a circuit arrangement of the kind described above, is to make it possible, in a particularly simple and adequately accurate fashion, to determine the distance of an aircraft from the particular VOR transmitter station.

In accordance with the invention, which relates to a circuit arrangement of the kind initially described, this object is achieved in that a counter circuit started by a bearing shift, is provided, which circuit, for an angle of determines a count by virtue of the fact that a pulse generator produces counting elements at a pulsing frequency of about 0.95 Hz, which elements are applied to the counter circuit; and in that the counting elements reached with the next bearing shift, are displayed to the pilot on a display instrument, the display instrument being calibrated in minutes in order to indicate the flight time to the VOR transmitter station at the airspeed employed for the measuring operation.

BRIEF DESCRIPTION OF THE DRAWINGS

Other objects, features and advantages of the invention, its organization, construction and mode of operation, will be best understood from the following detailed description taken in conjunction with the accompanying drawings, on which.

DESCRIPTION OF THE PREFERRED EMBODIMENT

Figures 1, 2:
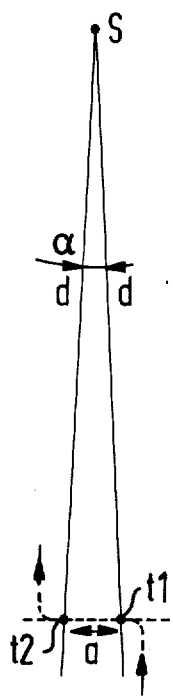
FIG. 1 is a simple illustration of the angular relationships involved in determining distance to a VOR transmitter.
FIG. 2 illustrates displayed values obtained in practicing the invention.

In FIG. 1, the position of a VOR transmitter station has been marked S. It is assumed that in relation to the two points marked $t1$ and $t2$, the distance to the transmitter station S is $d$. The apertural angle of the equilateral triangle thus formed is reference $\alpha$. It is assumed, furthermore, that $\alpha$ is the smallest angle (bearing shift angle) which can be unambiguously determined by a VOR receiver. This angular value is normally between 0.1° and 5°, i.e. the triangle S, $t1$, $t2$ is actually much more acute-angled than the drawing would suggest.

On the assumption that $d$ is very much greater than the distance a between the points $t1$ and $t2$, we have for the ratio of $d/a$ the relationship $\sin(90-\alpha°/2)/\sin\alpha°$. As the angular value has become progressively smaller and smaller, on the assumption that the chord ($t1, t2$) progressively approaches the arc, we obtain for $d/a$ a limiting value of $180/\pi = 57.2958$. For small angular values, the deviation from this limiting value is small: for $\alpha = 1°$, $d/a$ has a value 57.2965.

Starting with the above considerations, the distance of an aircraft from a VOR transmitter station can be determined in the following way.

An aircraft moving in accordance with the broken line, changes course so that it is lying perpendicularly to the radial position lines $\overline{S, t1}$ and $\overline{S, t2}$. At the instant at which the aircraft intercepts one of these position lines, the numerical value on the instrument display changes. If this numerical value shifts for example at time $t1$ to 247°, precisely (from 248°), as shown in FIG. 2, then after flying the distance a the angular value at the instant $t2$ (assuming $\alpha = 1°$) will shift to 246 degrees. Assuming constant airspeed, it is possible on the basis of the time taken to fly from $t1$ to $t2$, to determine the distance to the VOR transmitter station S. This is done quite simply by virtue of the fact that at a frequency of $57.2965/60 = 0.9545$ Hz, counting elements are generated. Counting which commences at $t1$ and ends at $t2$ (i.e. when a bearing shift of $\alpha$ has been flown) thus, with counting elements of 0.9549 Hz, results at the end of the measurement ($t2$) in a count which precisely indicates the distance from the VOR transmitter section S in minutes. The only assumption here is that the aircraft continues to fly at the same speed as in the measuring operation taking place between $t1$ and $t2$.

In FIG. 2, at the bottom, by way of example of the display of this kind of distance a value of 35 minutes has been shown.

The accuracy with which the aircraft must be flown perpendicularly to the position line $\overline{S, t1}$, is uncritical. For example, a deviation of $\pm 10°$ from the perpendicular produces a distance error of less than 2%.

Figure 3:
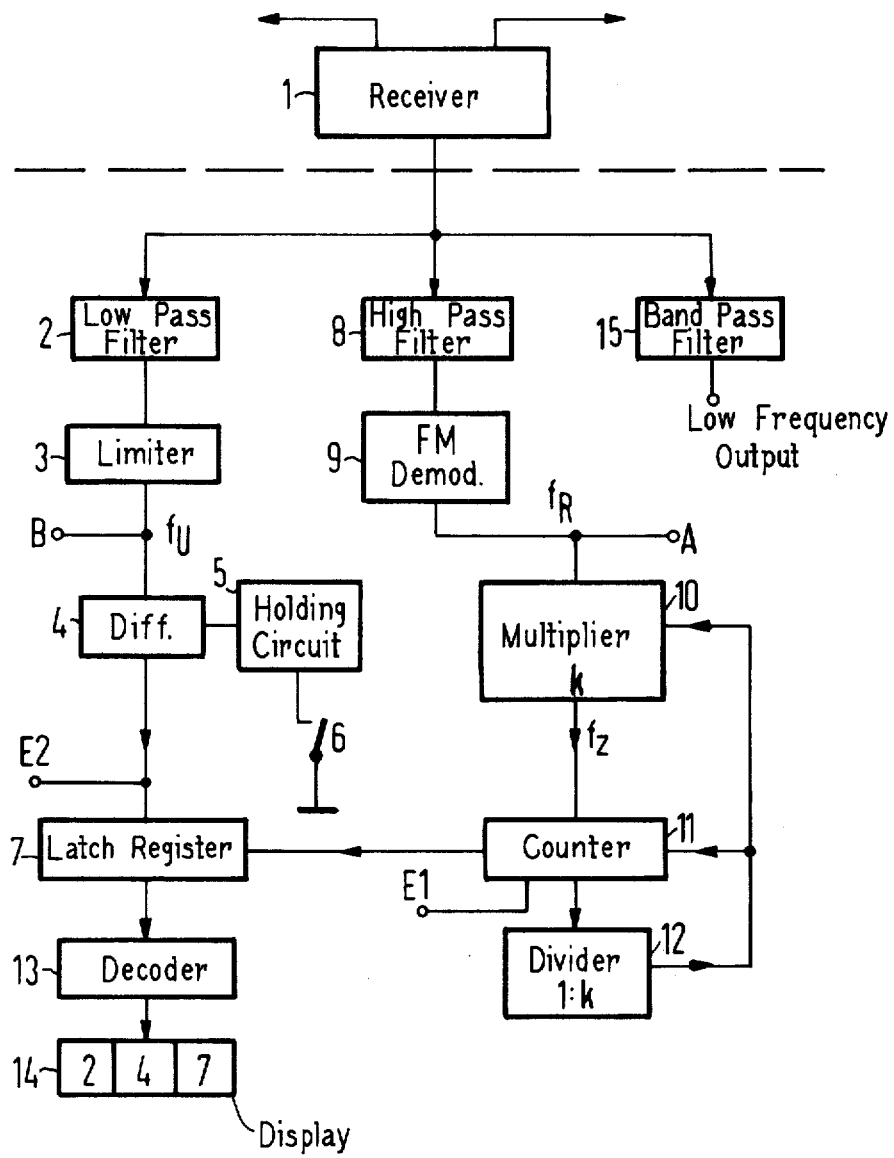
FIG. 3 illustrates the construction of a VOR receiver in accordance with the invention.

To explain how the azimuthal angle can be determined, in FIG. 3 a simple example of this kind of VOR has been illutrated. By the way, FIG. 3 corresponds in fact with the arrangement of FIG. 1 of the aforementioned U.S. patent application Ser. No. 574,633 filed May 5, 1975, and the German Patent Application No. P 24 21 722.9.

In the arrangement shown in FIG. 3, the low frequency output signals furnished from the conventional navigational receiver 1 are applied to a first receiver section(analyzer section) which contains a low-pass filter 2, a limiter 3, a differentiating element 4 with associated holding circuit 5 and a key 6. The output singals from the differentiating element 4 are supplied to a holding register or latch register as it is more commonly known, 7. The low-pass filter 2 filters out the 30 Hz rotational signal $f_U$ from the ground station. From these 30 Hz oscillations obtained in this way, the limiter 3 forms a sqaure-wave signal which is converted by the differentiating element 4 into a series of very narrow needle pulses. The latch circuit 5 is designed to retain for a specific time a specific count representing the angle in relation to a reference direction. In this fashion, instrument reading by the pilot is facilitated because continuous changes in the angular values when the course fluctuates, do not arise. If the pilot requires immediate and continuous read-out of the particular angular value, then it is possible by depressing the key 6 to disconnect the latch circuit 5 for a specific time, whereupon the particular angular values are displayed progressively.

In the second receiver section (analyzer section) to which the frequency modulated reference signal is applied, there is a high-pass filter 8, and FM demodulator 9, a frequency multipler stage 10, a counter cascade 11 and a divider 12. The counter cascade 11 is connected to the latch register 7 which stores the particular count. The high-pass filter 8 is tuned to 9.96 kHz, the carrier of the frequency modulated reference oscillation. At the output of the FM demodulator 9 accordingly the reference signal $f_R$ appears and this is a standard 30 Hz oscillation. This reference signal, conveniently already in the form of a square-wave oscillation, is applied to a frequency multiplier 10 in respect of whose output frequency the relationship: $f_z = k \cdot f_R$. Depending upon the required accuracy of the display of the angle, $k$ should be chosen as $k = 360 \cdot n$ or $k = 360/n$, and in all cases $n$ is a whole number. If, by way of a simple example we take $n = 1$, then $k$ is 360. Accrdingly, the frequency multiplier 10 would multiply the arriving reference frequency $f_R = 360$ Hz to give $30.360 = 10,800$ Hz. The output signal which represents the counting signal for the counting cascade 11, would therefore have a frequency of $f_z = 10,800$ Hz. The counter 11 is so operated that for a full oscillation of the reference $f_R$, commencing with a positive-going zero transit, it counts up to the value $k = 360 \cdot n$ or possibly 360/n, $n$ being a whole number. Considering the previously assumed numerical value of $n = 1$, $k = 360$ and the counter cascade 11 thus counts during an oscillation of the reference signal $f_R$, from 0 to 359. The count 360 is identical with the value 0, i.e. the counter cascade 11 is reset after a full run through, to the value 0. The reseting of the counter cascade 11 is effected by the divider 12 which is responsive to the value 1/k. In the present example, where $k = 360$, the reset pulse for the counter cascade 11 is issued by the divider 12 at that instant at which the count 360 would follow the count 359. In the counter cascade 11 itself, the count 360 does not however appear, the count 0 appearing instead.

The count reached by the counter cascade 11 is progressively fed into the latch register 7, and in the example chosen earlier, this means counts progressively reached between 0 and 359. At a specific instant (e.g. with a positive-going zero transit on the part of the rotation signal), which depends upon the phase angle between the reference signal $f_R$ and the rotational signal $f_U$, a gating pulse is supplied from the output of the differentiating element 4 to the input of the latch register 7. This gating pulse 6 fixes the count reached at this instant by the counter cascade 11, and applies it to a decoder 13. The function of this decoder is to convert the binary count which is produced if the counter cascade 11 as a binary on, into decimal numbers which are then displayed on an instrument 14. Taking the assumed case of $k = 360$, the instrument 14 thus displays whole degrees of arc, in the present example the azimuthal angular value 247°, in relation to a reference direction.

The frequency multiplier 10 as well as the counter cascade 11 and the divider 12 can also be included in the receiver section for the rotational signal $f_U$; to do this, the differentiating element 4, the latch circuit 5 and the key 6 would than have to be introduced into the receiver section for the reference signal $f_R$. Generally, it is of particular advantage to arrange for this incorporation to take place in that section in which the information is present as a frequency modulation, because the vulnerability to disturbance is least at that point. Using a bandpass filter 15, it is possible in a manner known per se to filter out the speech (or coding signals) from the ground station, and apply it (them) to a corresponding low-frequency output.

The counter cascade 11, which has been described in more detail in FIG. 2 of the aforementioned patent application Ser. No. 574,633 corresponding to German application P 24 21 722.9, for example incorporates units, tens and hundreds counters. Because the bearing shift by the value $\alpha$ in each case occurs at the smallest unit, it is simply the occurrence of a change in the units place which is drawn upon as a criterion for the commencement and end of the measuring operation. For this reason, the units place is tapped and taken to a terminal E1. In addition, between the differentiating element 4 and the latch register 7, a second tapping E2 is provided, and this is also used to carry out the measuring operation.

Figure 4:
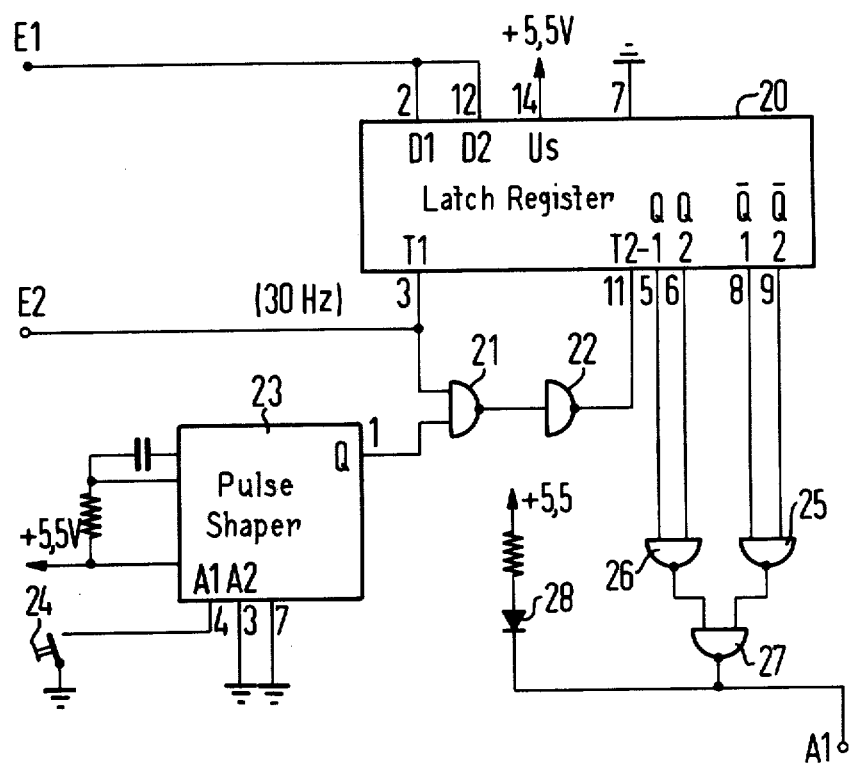
FIG. 4 illustrates a matching circuit for the VOR receiver of FIG. 3.

In FIG. 4, the circuit arrangements have been shown which analyze the commencement and end of the measuring operation. Via the terminal E1, the counting pulses are supplied in parallel to a double D flip-flop 20, at the D terminals 12 and 2. This flip-flop performs the function of a latch register and only responds to the change in the angle $\alpha$ (e.g. to 1°), this in fact after the initiation of the measuring operation. The terminal 3, the timing input of one D flip-flop 20, is supplied with the variable phase values via the connection E2. These values are also supplied via a NAND gate 31 which is followed by an inverter stage 22, to the terminal 11 supplying the second timing input of the double D flip-flop 20. The second input of the NAND gate 21 is connected to the terminal 1 of a pulse-shaped circuit 23 which may be for example a monostable trigger stage SN74121 manufactured by Texas Instruments. The terminal 4 of this pulse-shaper circuit 23 is connected to the key 24. By operating the key 24 to close and connect the terminal 4 to ground, the pilot initiates a measurement. He will previously have changed course so that he is flying perpendicularly to the position lines (radials) of FIG. 1. He operates the key 24 and at the terminal 1 of the pulse shaper stage 23 there consequently appears a determinate pulse of 50 msec duration which is applied via the gates 21 and 22 to the terminal 11 of the second timing input of the double flip-flop 20. The latch register is consequently readied and awaits the next bearing shift, i.e. at the instant $t1$, at which the count reached by the units counter in the counter cascade 11 (FIG. 3) varies by a value $\alpha$ at the connection E1, and the variable phase likewise at the connection E2, e.g. varies from 248° to 247°.

The outputs at the terminals 5 and 6, and 8 and 9 of the double D flip-flop 20 connected as a latch register, are connected to the inputs of the NAND gates 25 and 26. The outputs of the two NAND gates 25 and 26 are connected to a further NAND gate 27 so that the gates 26 and 27 together with the output of the latch register 20, form an EXCLUSIVE OR circuit. The output of the gate 27 is connected to the output terminal A1. Also connected to this output terminal A1 is a luminescent diode 28. When the key 24 has been depressed, the luminescent diode 28 lights up with the next bearing shift and indicates that the measuring operation is underway. At the end of the measuring operation it extinguishes again. The pilot is thus able to determine how long the actual measuring operation has lasted. This is necessary, because during the measuring operation the aicraft speed and flight direction perpendicularly to the position line must be maintained as accurately as possible in order to avoid measurement errors.

Figure 5:
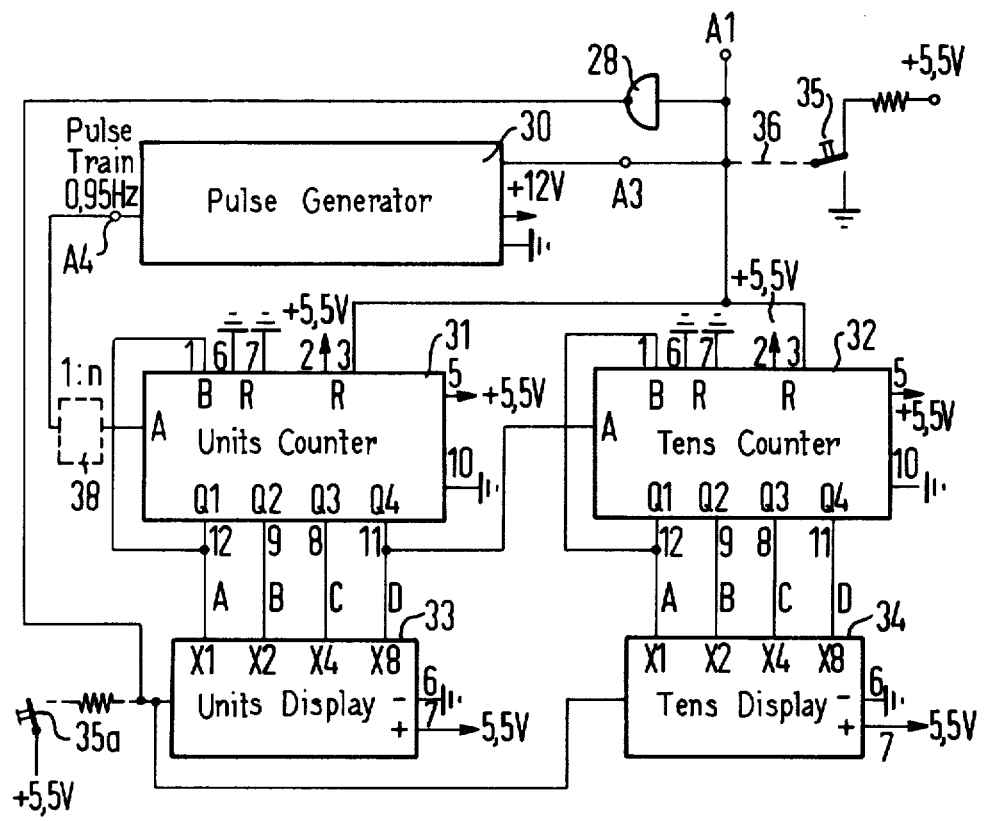
FIG. 5 illustrates a counter circuit for measuring distance in accordance with the invention.

In FIG. 5, the connecting terminal for the output of the circuit arrangement of FIG. 4 has likewise been marked A1. The connection A1, which signals the commencement and the end of the measuring operation, is connected to a pulse generator 30 and also to the reset inputs of a units counter 31 and a tens counter 32. The pulse generator 30 is described in detail in FIG. 6. At its output, during the measuring operation, (between $t1$ and $t2$) it supplies timing signals at 0.9549 Hz. These timing signals are applied to the input of the units counter 31. It is possible to use for this counter, for example, a module SN 7490 manufactured by Texas Instruments. In the counter 31, a count is thus produced which corresponds with the number of timing pulses produced by the pulse generator 30. Because the counter is designed as BCD counter, on reaching a tens place, the carry is effected to the tens counter 32. Display instruments 33 (for the units) and 34 (for the tens) are equipped with the outputs 12, 9, 8 and 11. For this purpose, Hewlett-Packard display modules of type designation HP 7300 can be used.

The measuring operation can also be initiated manually. This is indicated by a key 35 with the broken connecting line 36 establishing the connection with the terminal A1. By depressing the key the pulse generator 30 is thus started, and the counters 31 and 32 are activated, being halted when the key is released again. After the release of the key 35, the count, due to the presence of an inverter stage 28, is transferred to the display modules 33 and 34 and displayed. By operating an erase key 35a the displayed value can be erased. In this case, the counter unit is autonomous and should be handled like a stop watch, or may be connected using other matching devices, to other VOR instruments for automatic operation.

The display devices 33 and 34 display a numerical value which indicates the flight time to the particular VOR transmitter station selected in minutes. In accordance with the example illustrated in FIG. 2, the display instrument 33 would indicate a 5 and the instrument 34 a 3, thus showing a total flight time of 35 minutes to the VOR transmitter station S.

Figure 6:
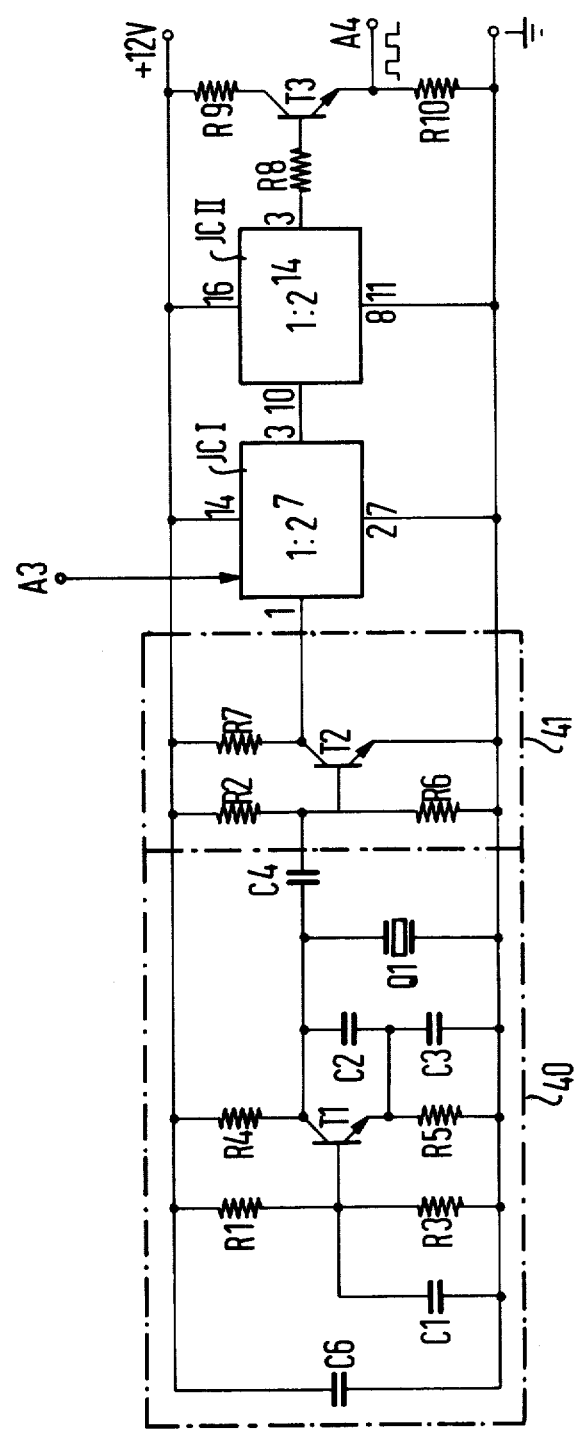
FIG. 6 illustrates the construction of a pulse generator for the counter circuit of FIG. 5.

In FIG. 6, the design of a crystal-controlled oscillator has been illustrated within the broken-line box 40. This oscillator contains a crystal Q1 which is connected to the collector of a transistor T1. Between the collector and the emitter of this transistor a capacitor C2 is arranged while in the ground lead from the emitter there is a parallel arrangement of a further capacitor C3 and a resistor R5. The collector of the transistor T1 is connected across a resistor R4 to the current supply terminal (+12 V) which is, in turn, grounded across a capacitor C6. Between the supply terminal and the base of the transistor T1 there is a resistor R1. A parallel arrangement of a resistor R3 and a capacitor C1, is connected to ground from the base of the transistor T1.

A coupling capacitor C4 serves to provide coupling to an ensuing coupling stage 41. The coupling stage 41 contains a pair of resistors R2 and R6 between which the coupling capacitor C4 and the base of a transistor T2 are connected. The emitter of the transistor T2 is grounded while its collector is connected across a resistor R7 to the power supply.

At the output of the transistor T2, two frequency-dividers JCI and JCII are connected in series. The crystal controlled oscillator starts to oscillate whenever the supply voltage is applied and the divider JCI is only activated when a zero potential signal is applied to the control input A3 (working from FIG. 5 either automatically by the NAND gate 27 in accordance with FIG. 4 or manually by means of the key 35). The base of an ouput transistor T3 is connected across a resistor R8 and its collector is connected to the voltage source across the resistor R9 while its emitter is grounded across a resistor R10. At the output teminal A4 a timing frequency of the requisite magnitude, i.e. precisely 0.9549 Hz, is produced. This point thus correspond with point A4 at the output of the pulse generator 30 of FIG. 5. The requisite output frequency is generated by arranging for the crystal controlled oscillator to oscillate, for example, at a frequency of 2.002658 Hz, the divider JCI having a division ratio of $1:2^7$ and the divider JCII having a division ratio of $1:2^{14}$. Because of the high frequency of the crystal control oscillator 40, it is possible to produce the divided output frequency at the terminal A4 extremely accurately so that a correspondingly accurate timing pulse train and therefore indication, is obtained. It is also possible to fly several bearing shifts, i.e. $n \cdot \alpha$, instead of just $\alpha$, in this context $n$ being a whole number. In this case, the result of counting must be reduced by a division of $n$. A simple solution in this context is to arrange to alter the division ratio of one of the dividiers JCI or JCII in a corresponding manner. If $n = 2$, then for example the divider JCI can have a ratio of $1:2^8$ instead of $1:2^7$. The counting frequency at the output A4 will then only be 0.4774 Hz.

It is also possible, when flying several bearing increments, i.e. $n \cdot \alpha$, to leave the timing pulse train constant at 0.9549 Hz and to display the results of counting on the instruments 33 and 34, after a division by $n$. This can be done by arranging between the timing output of the pulse generator 30 and the input of the units counter 31, a manually or an automatically adjustable divider 38, shown in broken lines (FIG. 5), which then takes into account the division ratio $n$.

The larger the number of bearing shifts $n$, the more inaccurate the result of measurement becomes. Consequently, this supplementation of the method is only of significance when using VOR instruments which produce an analog $k$ indication.

The decision upon how close to approach the timing frequency to the exact value, depends upon the desired accuracy. In all practical instances, it can be in the order of 0.95 Hz although the precise value of 0.9549 Hz.

Although I have described my invention by reference to particular illustrative embodiments thereof, many changes and modifications of my invention may become apparent to those skilled in the art without departing from the spirit and scope of the invention. I therefore intend to include within the patent warranted hereon, all such changes and modifications as may reasonably and properly be included within the scope of my contribution to the art.

I claim:

1. A circuit arrangement for determining the flight time of an aircraft from a VOR transmitter, said circuit arrangement connected with a VOR receiver which determines angular information of the VOR transmitter perpendicular to the radial position line extending from the transmitter with an accuracy of $\alpha$ degrees from one bearing shift to the next, comprising:
    a first counter, including a units location, counting in steps of $\alpha$ and including a tap for a count of $\alpha$ at said units location;
    a pulse generator operable to produce counting pulses at a predetermined pulsing frequency of somewhat less than 1 Hz;
    a latch register connected between said tap and said pulse generator and operable to deliver a measurement signal to said first counter for a time beginning with a change at said units location representing a bearing shift and ending with the next change at said units location representing the following bearing shift;
    a second counter connected to said pulse generator to receive said counting pulses; and
    display means connected to said second counter and calibrated in minutes for displaying the count to a pilot in order to indicate the flight time to the VOR transmitter at the air speed employed in the measuring operation.

2. The arrangement of claim 1, wherein the angle $\alpha$ is chosen to be 1°.

3. The arrangement according to claim 1, wherein said pulse generator is constructed to produce counting pulses at a frequency of about 0.9549 Hz.

4. The arrangement according to claim 1, wherein said pulse generator is constructed to produce counting pulses at a frequency of about 0.95 Hz.

5. The arrangement of claim 4, wherein for an angle $n \cdot \alpha$, where $n$ is a whole number, the arrangement comprises means connected to said pulse generator to cause counting pulses at about $0.95/n$ Hz to be generated and fed to said counter, whereupon the resulting count is displayed.

6. The arrangement of claim 4, wherein for an angle of $n \cdot \alpha$, where $n$ is a whole number, comprising means causing the display of only the $n^{th}$ part of the counting result.

7. The arrangement of claim 4 wherein said display means is a storage display means, and comprising means responsive to the end of a measuring operation to transfer the count from said counter to said display means for storage until the next measuring operation.

8. The arrangement of claim 7, comprising an erase key connected to and operable to reset said display means.

* * * * *